United States Patent [19]

Hogan

[11] Patent Number: 4,515,418
[45] Date of Patent: May 7, 1985

[54] BEARING ASSEMBLY WITH STAMPED RACES

[75] Inventor: Martin J. Hogan, Sandusky, Ohio

[73] Assignee: General Motors Corporation, Detroit, Mich.

[21] Appl. No.: 519,184

[22] Filed: Aug. 1, 1983

[51] Int. Cl.³ .............. F16C 33/60; F16C 33/72; F16C 43/00
[52] U.S. Cl. .................. 384/502; 384/486; 384/542
[58] Field of Search .............. 308/196, 195, 194, 178, 308/182, 187.1, 189 R, 189 A

[56] References Cited
U.S. PATENT DOCUMENTS

| 3,749,460 | 7/1973 | Hogan | 308/196 |
| 3,800,384 | 4/1974 | Keleshian | 308/196 X |
| 3,801,171 | 4/1974 | Rozentals | 308/184 R |
| 3,881,789 | 5/1975 | Kornylak | 308/187.1 |
| 4,362,344 | 12/1982 | Lederman | 308/196 X |

Primary Examiner—Stuart S. Levy
Assistant Examiner—Thomas R. Hannon
Attorney, Agent, or Firm—Patrick M. Griffin

[57] ABSTRACT

A two-piece pressed race bearing assembly of the type having stampable raceway halves further includes alternating, interfitted attachment flanges disposed to either side of a plane through the ball circle. A retention member is slide fitted between the flanges to force them apart and consequently retain the raceway halves together in a complete assembly.

4 Claims, 5 Drawing Figures

U.S. Patent  May 7, 1985  4,515,418
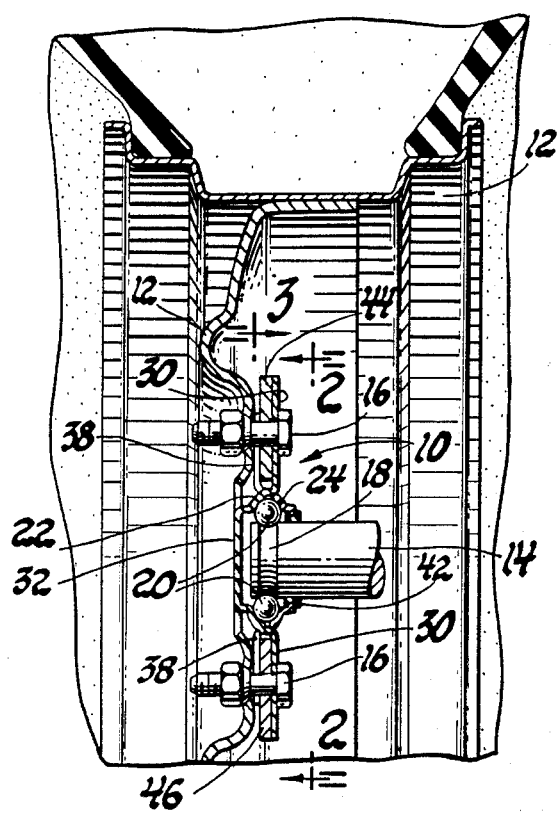
Fig.1
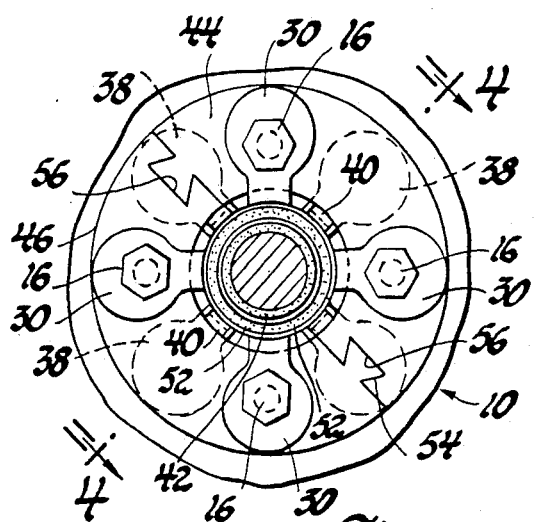
Fig.2
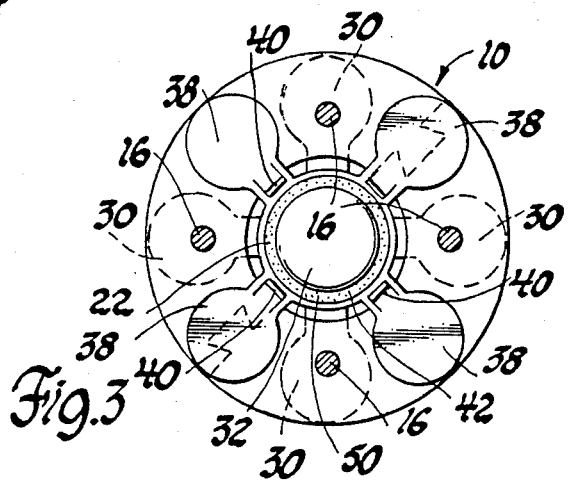
Fig.3
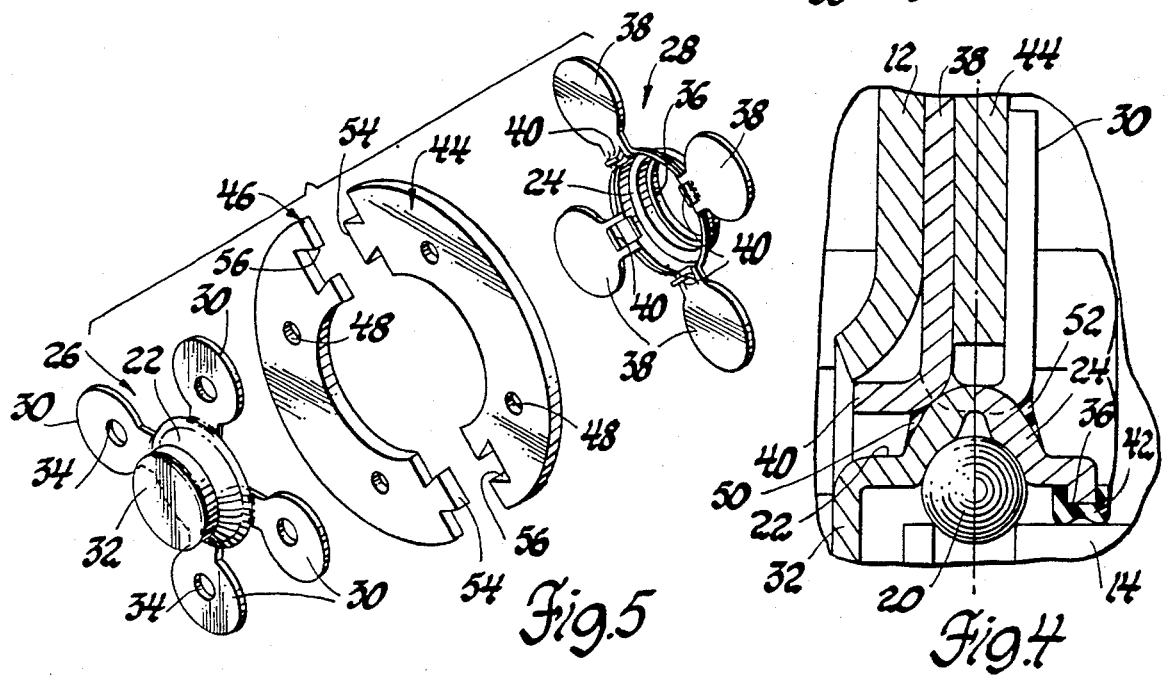
Fig.5
Fig.4

BEARING ASSEMBLY WITH STAMPED RACES

BACKGROUND OF THE INVENTION

This invention relates to bearings and specifically to bearings of the type having a raceway formed of two raceway halves or elements which terminate and mate with one another on the ball circle of a ball complement to allow the raceways to be made from stampings rather than ground members.

U.S. Pat. No. 3,749,460, to Hogan, assigned to the assignee of the present invention, discloses a radial ball bearing having an inner race fitted on a shaft with a 2 point contact or arch type outer raceway with a complement of bearing balls therebetween. The outer race is formed of a pair of raceway halves, each providing a symmetrical half of the raceway, and terminating on the ball circle so as to not change direction of curvature measured in the axial direction. Beyond the ball circle, each raceway half has integral, axially extending flanges which are designed to matingly interfit and snap past one another, retaining the halves together and forming a cylindrical surface fittable within an axial bore. In such an application, it is not necessary that the raceway halves be held together with any great force, and a separate snap ring retention may be used to retain the bearing within the bore.

SUMMARY OF THE INVENTION

The subject invention provides an improved bearing assembly having at least one arch type angular contact race formed of two symmetrical raceway halves which terminate on the ball circle and may be easily stamped, but having a different retention means by which the halves are maintained rigidly together as an assembly, and also allowing for structural attachment to another member to be rotatably supported by the bearing.

In the bearing assembly of the invention, at least the outer race is formed of a pair of symmetrical raceway halves, each comprising one half of an arch type angular contact raceway for a complement of bearing balls, the curved portion of each raceway half terminating on the ball circle whereby it may be easily stamped, as described above. Integral with and disposed circumferentially about the ball circle terminus of each raceway half is a series of flanges, the flanges of each half being disposed in a plane parallel to and on opposite sides of a plane including the ball circle. The attachment flanges of each half interfit and alternate with one another when the two halves are mated with one another to form the arch type raceway for the bearing balls. Sealing material may also be molded directly to the raceway halves. A pair of biasing members, each comprising approximately half of an annulus, have a thickness slightly greater than the spacing between the planes of the interfitted flanges. These are then fitted between the interfitted flanges, biasing them apart to maintain the raceway halves rigidly together and in a cooperative relationshp with each other and the sealing material to effect a sealing of the raceways.

The attachment flanges, in addition to providing the means for retaining the halves together, provide a convenient means for attaching and sealing the completed bearing assembly to any rotatable member desired, e.g. a wheel in the embodiment disclosed.

It is, therefore, an object of the invention to provide an easily and inexpensively constructed angular contact type bearing assembly. It is a more specific object of the invention to provide such an assembly in which the two halves of the arch type angular contact raceway may be easily stamped and rigidly held together to form the assembly which may be attached to a rotatable member.

It is a still more specific object of the invention to provide such a bearing assembly in which stamped raceway halves terminating on the plane of the ball circle of a complement of bearing balls are integral with interfitted flanges parallel to and spaced to either side of the plane of the ball circle and biased apart by an annular biasing member to maintain the raceway halves together as a rigid assembly and to provide a convenient means for attaching the assembly to a rotatable member, such as a wheel.

Another specific object of the invention is to provide such a bearing assembly to support a wheel on a shaft in which each stamped raceway half of each race has a layer or bead of sealant material molded thereto near the terminii of the raceway halves integral, and biased by the biasing members into the other raceway half to seal the bearing assembly in combination with a hub on one race and a shaft seal on the other race.

DESCRIPTION OF THE PREFERRED EMBODIMENT

These and other objects of the invention will appear from the following written description and the drawings in which:

FIG. 1 is a fragmentary cross-sectional view through one flange of the bearing assembly on the end of the shaft and rotatably mounting a wheel, FIG. 2 is a view from the perspective of line 2—2 of FIG. 1, FIG. 3 is a view from the perspective of line 3—3 of FIG. 1, FIG. 4 is a fragmentary view from the perspective of line 4—4 of FIG. 2, FIG. 5 is an exploded view of the constituent elements of the assembly.

Referring first to FIG. 1, the bearing assembly of the invention designated generally at 10, is shown mounting a wheel 12 to a shaft 14. Wheel 12 is attached conventionally to bearing 10 by attachment bolt 16 and a conventional inner race 18 is ground into the end of shaft 14 providing half of the rolling path for a complement of bearing balls 20, which may be a full complement or caged as desired. Details of the assembly of bearing 10 to shaft 14 of the wheel 12 will be further described below.

The other half of the rolling path for bearing balls 20 is provided by angular contact raceway of the 2 point contact or "arch" type provided by two symmetrical raceway halves 22 and 24, best visible in FIG. 4, each of which is an integral part of a larger stamped race 26 and 28, respectively, best visible in FIG. 5. As can be seen in FIG. 4, each raceway half 22 and 24 has a radially outer terminus just short of the plane of the ball circle of the bearing balls 20, indicated by the dot and dash line. As may be seen in FIG. 4, this allows each raceway half 22 and 24 to be easily stamped, as it does not reverse curvature in the axial direction.

Still referring to FIGS. 5 and 4, race 26 also includes a series of four flanges 30, which are generally circular in the embodiment disclosed and which are disposed circumferentially about and integral with the periphery of raceway half 22. As can best be seen in FIG. 4, the transition between each flange 30 and raceway half 22 is also designed not to change curvature in the axial direction, again to allow ease of stamping. Race 26 also includes a closed center cap 32 and a hole 34 through each flange 30, for purpose described below. Race 28 is similar to race 26, the main difference being that it is stamped with a radially inner terminus defining a central opening 36, rather than cap 32, and each of its flanges 38 has a perpendicular tab 40 lanced therein, for a purpose to be described below. Layers or beads of sealant 50, 52 are molded directly to the outside of raceway halves 22, 24, respectively, near the terminii thereof. The essentially symmetrical nature of races 26 and 28 allows the respective flanges 30 and 38 thereof to be alternatingly interfitted, as best seen in FIGS. 2 and 3. The assembly of the components will be next described.

Initially, race 28 would be placed over the end of shaft 14 with a suitable two lip seal 42 interposed between the surface of shaft 14 and the central opening 36 in race 28. Seal 42 may be molded directly to the edge of opening 36. Next, the complement of bearing balls 20 would be laid in place in inner race 18 and against the inside of raceway half 24, and caged, if desired. Next, race 26 would be matingly engaged with race 28, bringing raceway half 22 against bearing ball 20 with flanges 30 overlying raceway half 24 and flanges 38 overlying raceway 22, spaced to either side of the ball circle, in this case lying to either side of a plane through the ball circle, as shown by the dot and dash line in FIG. 4. Next, a pair of biasing members 44 and 46 are added. Each member 44 and 46 comprises generally half an annulus, as best seen in FIG. 5, and has attachment holes 48 therein matching holes 34 through flanges 30. Each biasing member 44 and 46 is of a thickness sufficient to tightly fit in the space between the alternating flanges 30 and 38, and is tightly slide fitted therebetween, being tapped in place if necessary, until the two elements 44 and 46 come together to form a complete annulus, as best seen in FIG. 2. In addition, interfitting dovetails 54 and slots 56 are snapped together to help maintain biasing members 44 and 46 in place. The tight fit serves to bias flanges 38 and 30 apart, and to consequently retain races 26 and 28 together in a very rigid assembly, despite the relatively thin gage of the stampings comprising it. It also forces one raceway half 22 into external sealing engagement with bead of sealant 52 and the other raceway half 24 into external sealing engagement with bead of sealant 50 at the juncture between raceway halves 22 and 24 to completely seal bearing balls 20, as best seen in FIG. 4. The fit of biasing members 44 and 46 also maintains the radially inner terminus of raceway half 24 radially spaced from and surrounding shaft 14.

As a final step, wheel 12 is added with bolts 16 passing through aligned attachment holes 34 and 48. It will be appreciated that holes 48 could be added as a final step, if desired. As an added feature, the edge 52 of the central hole through wheel 12 engages tabs 40 on race 28 to help position the wheel on the bearing assembly. It will be understood that the races 26 and 28 and biasing elements 44 and 46 make up a complete, separately handled and rigid assembly, bolts 16 and wheel 12 being merely added to illustrate a possible use for bearing assembly 10. Therefore, either of the flanges 30 or 38 could be used as attachment flanges equally as well, although they need not be used as attachment flanges at all, if the bearing is mounted in some other fashion. What is important is that the flanges lie to either side of the ball circle, so that the biasing members may force them apart, whatever their shape.

Any conventional inner raceway 18 could be used instead of that illustrated, such as a conventional ring, making bearing assembly 10 useful in a flange bearing application, for example. In addition, it will be understood that in large diameter applications, races 26 and 28 could be stamped with the flanges on the inside periphery with a conventional outer race ground into some other member. Both inner and outer raceways could be made up of stamped races biased and retained together in the same fashion, if desired. All the possible embodiments would provide a bearing assembly with easily stamped races in which the races are rigidly but simply held together in a separately handled assembly, with readily available means for attaching the bearing to any rotatable member.

The embodiments of the invention in which an exclusive property or privilege is claimed are defined as follows:

1. A bearing assembly incorporating stamped races of the type having at least one angular contact raceway formed of two raceway halves, each raceway half being integral with a race and terminating on a ball circle of a ball complement, comprising, a series of flanges disposed circumferentially about a terminus of each raceway half on either side of the ball circle, the flanges of each race interfitting and alternating with the flanges of the other race and overlying the raceway half of the other race when the two races are placed together with the ball complement therebetween, and biasing members, receivable between the interfitted flanges of the races and being of a thickness sufficient to bias the flanges of each raceway half apart, said biasing serving to maintain the races together as an assembly.

2. A bearing assembly incorporating stamped races of the type having at least one angular contact raceway formed of two raceway halves, each raceway half being integral with a race and terminating on a ball circle of a ball complement, comprising, a series of flanges disposed circumferentially about a terminus of each raceway half in a plane parallel to a plane of the ball circle, the flanges of each race interfitting and alternating with the flanges of the other race and overlying the raceway half of the other race when the two races are placed together with the ball complement therebetween, and biasing members, each biasing member generally comprising an annular segment receivable between the interfitted flanges of the races in a plane including the plane of the ball circle, and being of a thickness sufficient to bias the flanges of each raceway half apart, said biasing serving to maintain the races together as an assembly.

3. A bearing assembly incorporating stamped races of the type having at least one angular contact raceway formed of two raceway halves, each raceway half being integral with a race and terminating on a ball circle of a ball complement, comprising, seal means molded directly to a outside surface of each raceway half near a terminus thereof, a series of flanges disposed circumferentially about the terminus of each raceway half on either side of the ball circle, the flanges of each race interfitting and alternating with the flanges of the other race and overlying the raceway half of the other race when the two races are placed together with the ball complement therebetween, and biasing means, receivable between the interfitted flanges of the races and being of a thickness sufficient to bias the flanges of each raceway half apart, said biasing serving to maintain the races together as an assembly, and force one raceway half into external sealing engagement with the seal means of the other raceway half.

4. A bearing assembly adapted for installation on a shaft and incorporating stamped races of the type having at least one angular contact raceway formed of two raceway halves, each raceway half being integral with a race and having a radial outer terminus with one of the two raceway halves having a radial inner terminus, on a ball circle of a ball complement, comprising, seal means molded directly to a outside surface of each raceway half near the radial outer terminus thereof and molded to the radial inner terminus of the said one raceway half, a series of flanges disposed circumferentially about the radially outer terminus of each raceway half on either side of the ball circle, the flanges of each race interfitting and alternating with the flanges of the other race and overlying the raceway half of the other race when the two races are placed together with the ball complement therebetween, and biasing means, receivable between the interfitted flanges of the races and being of a thickness sufficient to bias the flanges of each raceway half apart, said biasing serving to maintain the races together as an assembly, to force one raceway half into external sealing engagement with the seal means of the other raceway half at their respective radially outer terminii and to maintain the seal means on the radially inner terminus of said one raceway in sealing engagement with the shaft.

* * * * *